(12) United States Patent
Israelsson et al.

(10) Patent No.: US 10,139,239 B2
(45) Date of Patent: Nov. 27, 2018

(54) LOW LATENCY METHOD AND SYSTEM FOR SENDING CLOUD DATA TO A VEHICLE

(71) Applicant: VOLVO CAR CORPORATION, Gothenburg (SE)

(72) Inventors: Erik Israelsson, Gothenburg (SE); Johannes Ohlin, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 185 days.

(21) Appl. No.: 15/139,570

(22) Filed: Apr. 27, 2016

(65) Prior Publication Data
US 2016/0327404 A1    Nov. 10, 2016

(30) Foreign Application Priority Data
May 4, 2015   (EP) .................................. 15166157

(51) Int. Cl.
| G01C 21/36 | (2006.01) |
| H04W 4/029 | (2018.01) |
| G08G 1/0967 | (2006.01) |
| H04W 4/04 | (2009.01) |
| H04L 29/08 | (2006.01) |
| G08G 1/01 | (2006.01) |
| G08G 1/056 | (2006.01) |
| G08G 1/09 | (2006.01) |

(52) U.S. Cl.
CPC ....... *G01C 21/3617* (2013.01); *G08G 1/0112* (2013.01); *G08G 1/0141* (2013.01); (Continued)

(58) Field of Classification Search
CPC ............. G01C 21/3617; G08G 1/0112; G08G 1/0141; G08G 1/056; G08G 1/093; (Continued)

(56) References Cited

U.S. PATENT DOCUMENTS

| 8,174,447 B2 * | 5/2012 | Loidl .................... G01S 5/0252 342/451 |
| 2009/0176512 A1 | 7/2009 | Morrison |

(Continued)

FOREIGN PATENT DOCUMENTS

| WO | 2009143876 | 12/2009 |
| WO | 2010031752 | 3/2010 |
| WO | 2014170444 | 10/2014 |

OTHER PUBLICATIONS

Extended European Search Report for European Application No. EP 15166157.6, Completed by the European Patent Office, dated Oct. 29, 2015, 7 Pages.

*Primary Examiner* — Anne M Antonucci
*Assistant Examiner* — James E Stroud
(74) *Attorney, Agent, or Firm* — Brooks Kushman P.C.

(57) ABSTRACT

A method and system for selecting a subset of cloud stored data related to locations within a road network and sending it to a vehicle. A current position of the vehicle is determined. A most probable path of the vehicle is determined as a set of possible paths ahead of the vehicle that the vehicle is most probable to travel along, and a subset of data is selected related to a location that is along this most probable path. Alternatively, a respective inverse most probable path up to each respective location related to a respective subset of data is determined as a respective set of possible paths leading up to each respective location. If the current position of the vehicle is included in an inverse most probable path, the related subset of data selected. The selected subset of data is sent to the vehicle.

17 Claims, 2 Drawing Sheets

(52) U.S. Cl.
CPC ............. *G08G 1/056* (2013.01); *G08G 1/093* (2013.01); *G08G 1/096716* (2013.01); *G08G 1/096741* (2013.01); *G08G 1/096775* (2013.01); *H04L 67/18* (2013.01); *H04W 4/029* (2018.02); *H04W 4/046* (2013.01)

(58) Field of Classification Search
CPC ....... G08G 1/096716; G08G 1/096741; G08G 1/096775; H04L 67/18; H04W 4/028; H04W 4/046
USPC ........................................................ 701/424
See application file for complete search history.

(56) References Cited

U.S. PATENT DOCUMENTS

| | | | |
|---|---|---|---|
| 2012/0033692 A1* | 2/2012 | Schleuning | H01S 5/06825 372/34 |
| 2012/0057471 A1* | 3/2012 | Amini | H04W 24/04 370/242 |
| 2013/0077610 A1* | 3/2013 | Amini | H04W 52/0216 370/338 |
| 2013/0142184 A1* | 6/2013 | Wang | H04L 5/0053 370/338 |
| 2014/0254543 A1 | 9/2014 | Engelhard et al. | |
| 2014/0350839 A1* | 11/2014 | Pack | G01C 21/30 701/409 |
| 2015/0172309 A1* | 6/2015 | Zandani | H04L 63/1433 726/25 |
| 2015/0355827 A1* | 12/2015 | Van Der Westhuizen | G06F 3/0482 715/788 |
| 2016/0076896 A1* | 3/2016 | Konig | G01C 21/26 701/411 |
| 2016/0076905 A1* | 3/2016 | Broadbent | G01C 21/3691 701/414 |
| 2018/0084710 A1* | 3/2018 | Lawson | B62D 15/025 |

* cited by examiner

LOW LATENCY METHOD AND SYSTEM FOR SENDING CLOUD DATA TO A VEHICLE

CROSS-REFERENCE TO RELATED APPLICATIONS

This application claims foreign priority benefits under 35 U.S.C. § 119(a)-(d) to European patent application number EP 15166157.6, filed May 4, 2015, which is incorporated by reference in its entirety.

TECHNICAL FIELD

The present disclosure relates to a method for selecting a subset of cloud stored data related to a road network and sending the subset of data to a vehicle which is connected to the cloud and operates within the road network. The disclosure further relates to a system for selecting a subset of cloud stored data related to a road network and sending the subset of data to a vehicle which is connected to the cloud and operates within the road network.

BACKGROUND

It is a current trend that future vehicles will be connected. Connectivity provides new means for both safety and convenience applications. Connectivity between vehicles can be realized both through direct communication between vehicles and between vehicles and roadside infrastructure, e.g. using automotive WiFi according to the IEEE 802.11p standard, and also through communication over an existing mobile cell network. Communication in this way may e.g. be via some cloud-based back-end system.

A challenge related to cloud-based communication between vehicles or between vehicles and infrastructure is that many communication messages may need to be routed from the cloud to specific vehicles, often based on the location of the vehicle, i.e. using unicast of messages rather than broadcast of messages.

Previously known solutions to manage distribution of information to vehicles based on the locations of the vehicles have proposed a pattern where the same subset of data, relevant to an area or to a position within the area, is sent to all vehicles within that area. This may be done through applying a grid pattern that defines areas in which the same information is broadcast to all vehicles therein. In this case, the actual communication implementation could be unicast, i.e. cloud-to-one-vehicle, but since the same data is communicated to all vehicles in the area, it is in practice a broadcast. This previously known solution is a relatively rough method since vehicles will receive a fair amount of irrelevant data, including data related to roads that the vehicle is unlikely to travel. This might be relevant e.g. in cases where there are no interconnections between local roads next to a highway road although the roads are close to each other in the same geographical area.

Document US 2014254543 discloses a method for transmitting data between a mobile terminal, such as a mobile terminal in a motor vehicle, and at least one stationary data network. A wireless interface provides a location-dependent transmission bandwidth for mobile access to a stationary data network. To this end, historical values relating to wireless interface parameters for a plurality of locations and for predetermined times are stored in a geo-database. Expected values for future data transmissions are ascertained from stored values. At the outset, a probable route for movement and an estimated arrival time of the mobile terminal (vehicle) at a location along the route are ascertained, i.e. a route of the vehicle is determined for a mobile terminal in the vehicle and it is checked whether a problem may exist with a transmission bandwidth of a wireless interface of the data network along the route. The expected transmission bandwidth at the location is then ascertained based on the geo-database. The geo-database may be a data service provided for the mobile terminal by a server of the least one stationary data network. During the transmission of data, at least one data transmission is regulated in accordance with the transmission bandwidths expected to be available along the route. In this way connectivity of moving terminals connected via air interfaces to the Internet can be improved.

However, although US 2014254543 discloses a general concept for managing bandwidth for data traffic over a cell network, US 2014254543 relate only to how to improve connectivity and dispatch information to one mobile terminal (vehicle) at a time.

SUMMARY

Embodiments herein aim to provide an improved method for selecting a subset of cloud stored data related to locations within a road network and sending the selected subset of data to a vehicle which is connected to the cloud and operates within the road network in order to facilitate dispatch of information only to a subset of connected vehicles within the road network to which the information is relevant.

This is provided through a method for selecting a subset of cloud stored data related to locations within a road network and sending the selected subset of data to a vehicle which is connected to the cloud and operates within the road network, the method comprising the steps of: determining a current position of the vehicle within the road network; and either determining a most probable path of the vehicle as a set of possible paths ahead of the vehicle that the vehicle is most probable to travel along given its current position within the road network, and selecting a subset of data related to a location within the road network that is along the most probable path of the vehicle; or determining a respective inverse most probable path up to each respective location related to a respective subset of data as a respective set of possible paths in the road network leading up to a respective location related to a respective subset of data, and checking if the current position of the vehicle within the road network is included in an inverse most probable path related to any subset of data, and if the current position of the vehicle within the road network is included in an inverse most probable path related to a subset of data selecting that subset of data; and sending the selected subset of data to the vehicle.

According to a second embodiment, the method further comprises the steps of: either having a cloud logic calculate the most probable path whenever the vehicle reports an update on its current position in the road network, and checking if there is any new subset of existing data related to a location within or segment of the road network along the re-calculated most probable path, and if so, selecting the new subset of existing data; or having a cloud logic calculate a respective inverse most probable path up to each respective location related to a respective subset of data as a respective set of possible paths in the road network leading up to a respective location related to a respective subset of data, and checking whenever the vehicle reports an update on its current position in the road network if the updated current position of the vehicle within the road network is included in an inverse most probable path related to any new subset of existing data, and if the updated current position of the vehicle within the road network is included in an inverse most probable path related to a new subset of existing data selecting that new subset of existing data; and sending the selected new subset of existing data to the vehicle.

The provision of having a cloud logic calculate the most probable path or a respective inverse most probable path provides a working solution.

According to a third embodiment, the method further comprises the steps of: either having a cloud logic use a look-up table with stored most probable paths for any given position in the road network for determining the most probable path of the vehicle whenever the vehicle reports an update on its current position, and checking if there is any new subset of existing data related to a location within the road network along the determined most probable path, and if so, selecting that new subset of existing data; or having a cloud logic use a look-up table with stored inverse most probable paths for any given position in the road network whenever the vehicle reports an update on its current position and checking if the updated current position of the vehicle within the road network is included in an inverse most probable path related to any new subset of existing data, and if the updated current position of the vehicle within the road network is included in an inverse most probable path related to a new subset of existing data selecting that new subset of existing data; and sending the selected new subset of existing data to the vehicle.

The provision of having a cloud logic use a look-up table with stored most probable paths or inverse most probable paths for any given position, possibly with direction considered, in the road network whenever a vehicle reports an update on its current position, possibly with direction considered, provides a quicker and more efficient solution by reducing the required amount of calculations and thus reduce system latency.

According to a fourth embodiment, the look-up table is provided as data added to a digital map data structure of the road network, with most probable path or inverse most probable path data added for positions along every road segment or road node represented in the digital map data structure.

The provision of providing the look-up table as data added to a digital map data structure of the road network further facilitates finding the most probable path or inverse most probable path for a given position, possibly with direction considered, in the road network.

According to a fifth embodiment, upon updating the digital map data structure the most probable path or inverse most probable path is recalculated for positions along each respective road segment or road node of the digital map data structure that is updated and the look-up table updated correspondingly.

The provision of updating the look-up table with a recalculated most probable path or inverse most probable path for each respective road segment or road node of the digital map data structure that is updated helps keep the amount of recalculations necessary each time the map is updated to a minimum.

According to a sixth embodiment, a most probable path or inverse most probable path for a given position in the road network is set to have an expiry time in the look-up table, such that the most probable path or inverse most probable path is deleted from the look-up table once it has passed its expiry time.

The provision of a most probable path or an inverse most probable path having an expiry time ensure that the look-up table is up to date and adapted to changes in the road network, e.g. removed or closed roads.

According to a seventh embodiment, the most probable path or inverse most probable path is recalculated directly after deletion thereof and the look-up table updated with the recalculated most probable path or inverse most probable path.

The provision of recalculating a most probable path or inverse most probable path directly after deletion thereof further ensure that the look-up table is up to date and adapted to changes in the road network, e.g. added or reopened roads.

According to an eighth embodiment, as soon as a vehicle reports a current position within the road network, a most probable path is calculated for that position within the road network and stored in the look-up table.

The provision of calculating and storing a most probable path as soon as a vehicle reports a current position, possibly with direction considered, within the road network enables rapid population of the look-up table and maintaining it up to date and adapted to changes in the road network.

According to a ninth embodiment, if the look-up table is missing a most probable path for the position in the road network where the vehicle is located, the cloud logic calculates a most probable path for that position in the road network and populates it in the look-up table.

The provision of calculating a most probable path for a missing position, possibly with direction considered, in the road network and populating the look-up table therewith enables rapid and efficient population of the look-up table for missing locations.

According to a tenth embodiment, the vehicle's historical travel pattern in the road network is used to optimize the most probable path of this specific vehicle through the cloud logic keeping track of typical routes in the road network that this specific vehicle often follows and using this historical travel pattern in the road network to predict a unique most probable path for this specific vehicle.

The provision of using the vehicle's historical travel pattern in the road network to optimize the most probable path of this specific vehicle enables improved prediction of the probability of branches in the most probable path for that specific vehicle.

According to an eleventh embodiment, that the unique most probable path for the specific vehicle is included in the look-up table.

The provision of including the unique most probable path for the specific vehicle in the look-up table enables improved selection of relevant a subset of data and sending thereof to the specific vehicle.

According to a twelfth embodiment, whenever a new subset of data related to a location in the road network is reported to the cloud logic, the following steps are performed: either determining an inverse most probable path up to the location related to the new subset of data as a set of possible paths in the road network leading up to the location related to the new subset of data and checking if the current position of the vehicle within the road network is included in the inverse most probable path, and if the current position of the vehicle within the road network is included in the inverse most probable path sending the new subset of data to the vehicle; or determining a most probable path of the vehicle as a set of possible paths ahead of the vehicle that the vehicle is most probable to travel along given its current position within the road network, and checking if the location in the road network related to the new subset of data is included the most probable path, and if the location in the road network related to the new subset of data is included the most probable path sending the new subset of data to the vehicle.

The provision of either determining an inverse most probable path and if the current position, possibly with direction considered, of the vehicle within the road network is included in the inverse most probable path sending the new subset of data to the vehicle, or determining a most probable path and if the location in the road network related to the new subset of data is included the most probable path sending the new subset of data to the vehicle will ensure that the new subset of data is sent to a vehicle to which it is relevant without any unnecessary delays.

According to an thirteenth embodiment, the method further comprises the steps of: either having a cloud logic calculate the inverse most probable path for determining the inverse most probable path whenever a new subset of data related to a location in the road network is reported to the cloud logic; or having a cloud logic calculate the most probable path for determining the most probable path whenever a new subset of data related to a location in the road network is reported to the cloud logic.

The provision of having a cloud logic calculate the inverse most probable path or most probable path provides one working solution.

According to an fourteenth embodiment, the method further comprises the steps of: either having a cloud logic use a look-up table with stored inverse most probable paths for any given position in the road network for determining the inverse most probable path whenever a new subset of data related to a location in the road network is reported to the cloud logic; or having a cloud logic use a look-up table with stored most probable paths for any given position in the road network for determining the most probable path whenever a new subset of data related to a location in the road network is reported to the cloud logic.

The provision of using a pre-calculated look-up table for inverse most probable paths or most probable paths is useful to speed up the cloud logic and reduce system latency.

According to a final embodiment, a system for selecting a subset of cloud stored data related to locations within a road network and sending the selected subset of data to a vehicle which is connected to the cloud and operates within the road network is provided. The system comprising a cloud storage arrangement for storage of data related to the road network and a cloud logic for determination of most probable paths and/or inverse most probable paths as well as a communication arrangement for receiving a position of the vehicle and sending subsets of data to the vehicle in accordance with the method as above.

A system as above facilitates dispatch of information only to a subset of connected vehicles within the road network to which the information is relevant.

BRIEF DESCRIPTION OF THE DRAWINGS

In the following, embodiments herein will be described in greater detail by way of example only with reference to attached drawings, in which.

Still other features of embodiments herein will become apparent from the following detailed description considered in conjunction with the accompanying drawings. It is to be understood, however, that the drawings are designed solely for purposes of illustration and not as a definition of the limits hereof, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
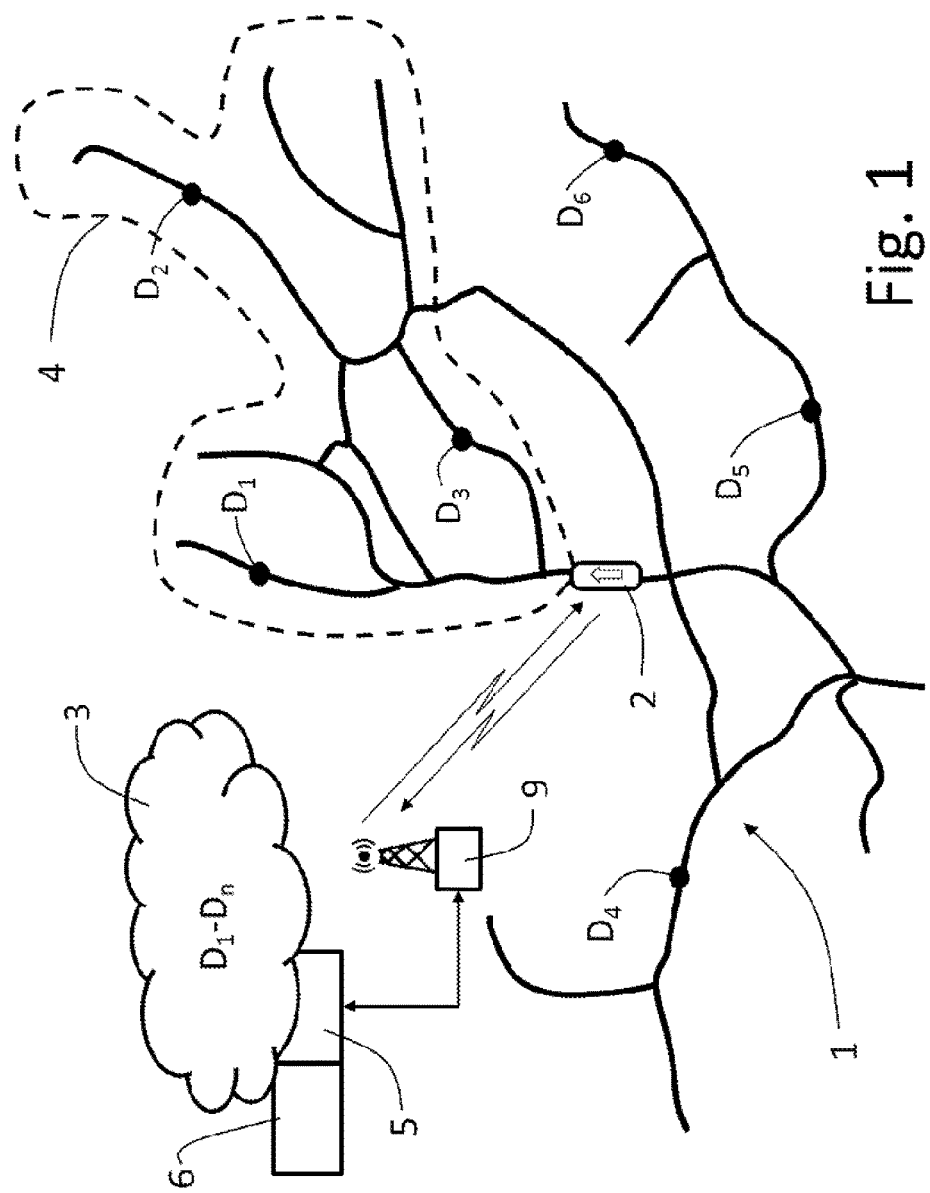
FIG. 1 is a schematic illustration of a method and system for selecting and sending a subset of cloud stored data relevant to a vehicle to that vehicle.

The present disclosure proposes, and illustrates in FIG. 1, a solution to how to dispatch information only to a subset of connected vehicles 2 (only one is shown in FIG. 1) operating in a road network 1 to which the information is relevant. One type of data is safety related data used in a vehicle 2 to inform and warn a driver of various hazards ahead of the vehicle 2 in order to reduce the risk of road accidents.

A challenge with any method for selection of data to be sent to vehicles in this way is that it should work over large geographical areas and with large amounts of data. Ideally, it should add a minimum of latency. Especially for safety related data where a quick response is desired.

Thus, this disclosure proposes an effective method to optimally select which subset $D_S$ of data $D_1$-$D_n$ stored in a cloud 3 that shall be sent to each respective vehicle 2 connected to the cloud 3. Typically, only data describing a traffic event close to, and ahead of, a vehicle 2 is relevant to that specific vehicle 2. Data behind the vehicle 2 or data related to roads that the vehicle 2 cannot access is irrelevant and should not be sent to the vehicle 2, not even if the data is related to a position very close to the vehicle 2.

A first approach described herein is to use a calculated most probable path 4 of the vehicle 2. The most probable path 4 of the vehicle 2 is the set of all possible paths ahead of the vehicle 2 that the vehicle 2 is most probable to travel along given its current position, possibly with direction considered. The set of all possible paths ahead of the vehicle 2 in FIG. 1 is thus the roads encircled by the dashed line 4.

Figure 2:
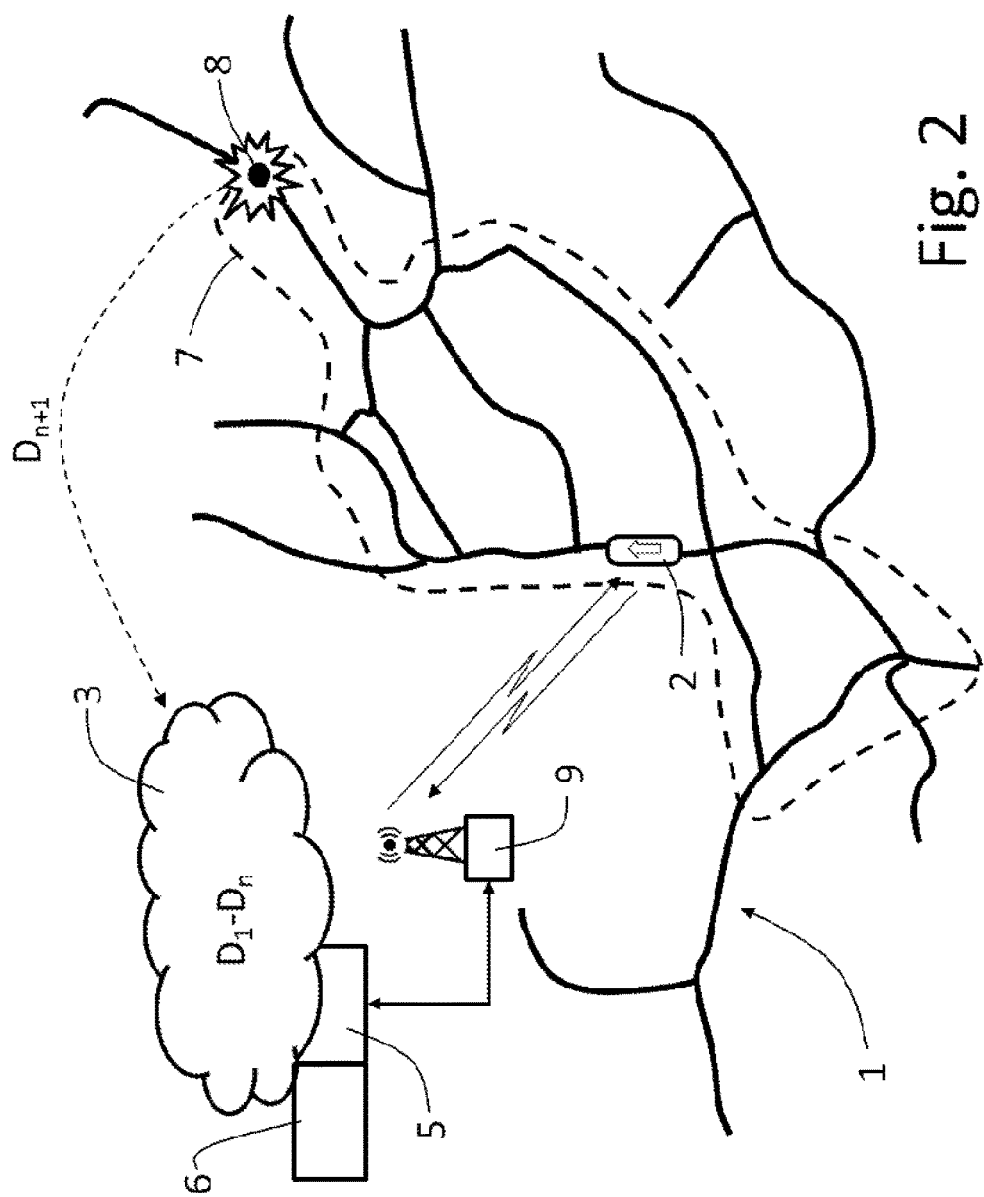
FIG. 2 is a schematic illustration of how to find a vehicle to which new data entered to the cloud storage is relevant and sending that new data to that vehicle.

The direction is illustrated in FIGS. 1 and 2 by the arrow overlaid the vehicle 2. Direction of a vehicle 2, as used herein, refers to the direction of travel of the vehicle 2, or if the vehicle 2 is stationary, its most recent direction of travel, or the direction in which the vehicle 2 is oriented considering its primary direction of travel, normally forward.

The most probable path 4 of the vehicle 2 is used to select a relevant subset of data $D_S$ related to the road network 1 in order to send it to the vehicle 2. If the subset of data $D_S$ is related to a point or segment in the road network 1 that is, or partly is, in the most probable path 4 of the vehicle 2, then that subset of data $D_S$ shall be sent to that vehicle 2.

In FIG. 1 the relevant subset of data $D_S$ consist of data items $D_1$, $D_2$ and $D_3$ which all are related to a point or segment in the road network 1 that is, or partly is, in the most probable path 4 of the vehicle 2. Data items D4, D5 and D6, however, are not related to a point or segment in the road network 1 that is, or partly is, in the most probable path 4 of the vehicle 2, and therefore not included in the relevant subset of data $D_S$.

A second approach described herein is to use a respective inverse most probable path 7 up to each respective location 8 related to a respective subset of data $D_S$ as a respective set of all possible paths in the road network 1 leading up to a respective location 8 related to a respective subset of data $D_S$, and checking if the current position, possibly with direction considered, of the vehicle 2 within the road network 1 is included in an inverse most probable path 7 related to any subset of data $D_S$, and if the current position, possibly with direction considered, of the vehicle 2 within the road network 1 is included in an inverse most probable path 7 related to a subset of data $D_S$ selecting that subset of data $D_S$ and sending it to the vehicle 2.

Locations or positions within a road network 1, as used herein, also include locations and positions that, at least partly, are along segments or portions of that road network 1.

Thus in a general embodiment a method for selecting a subset $D_S$ of cloud 3 stored data $D_1$-$D_n$ related to locations within a road network 1 and sending the selected subset of data $D_S$ to a vehicle 2 which is connected to the cloud 3 and operates within the road network 1, comprises the steps of: determining a current position, possibly with direction considered, of the vehicle 2 within the road network 1; and either determining a most probable path 4 of the vehicle 2 as a set of all possible paths ahead of the vehicle 2 that the vehicle 2 is most probable to travel along given its current position, possibly with direction considered, within the road network 1, and selecting a subset of data $D_S$ related to a location within the road network 1 that is along the most probable path 4 of the vehicle 2; or determining a respective inverse most probable path 7 up to each respective location 8 related to a respective subset of data $D_S$ as a respective set of all possible paths in the road network 1 leading up to a respective location 8 related to a respective subset of data $D_S$, and checking if the current position, possibly with direction considered, of the vehicle 2 within the road network 1 is included in an inverse most probable path 7 related to any subset of data $D_S$, and if the current position, possibly with direction considered, of the vehicle 2 within the road network 1 is included in an inverse most probable path 7 related to a subset of data $D_S$ selecting that subset of data $D_S$; and sending the selected subset of data $D_S$ to the vehicle 2.

In one further embodiment, the method further comprises the steps of: either having a cloud logic 5 calculate the most probable path 4 whenever the vehicle 2 reports an update on its current position, possibly with direction considered, in the road network 1, and checking if there is any new subset of existing data $D_N$ related to a location within or segment of the road network 1 along the re-calculated most probable path 4, and if so, selecting the new subset of existing data $D_N$; or having a cloud logic 5 calculate a respective inverse most probable path 7 up to each respective location 8 related to a respective subset of data $D_S$ as a respective set of all possible paths in the road network 1 leading up to a respective location 8 related to a respective subset of data $D_S$, and checking whenever the vehicle 2 reports an update on its current position, possibly with direction considered, in the road network 1 if the updated current position, possibly with direction considered, of the vehicle 2 within the road network 1 is included in an inverse most probable path 7 related to any new subset of existing data $D_N$, and if the updated current position, possibly with direction considered, of the vehicle 2 within the road network 1 is included in an inverse most probable path 7 related to a new subset of existing data $D_N$ selecting that new subset of existing data $D_N$; and sending the selected new subset of existing data $D_N$ to the vehicle 2.

Thus, in this embodiment the method further comprises the steps of having a cloud logic 5 repeatedly calculate the most probable path 4 or a respective inverse most probable path 7 and checking if there is any new subset of existing data $D_N$ related to a location within or segment of the road network 1 along the re-calculated most probable path 4 or if the updated current position, possibly with direction considered, of the vehicle 2 within the road network 1 is included in an inverse most probable path 7 related to a new subset of existing data $D_N$.

Although this is a working solution it requires that the most probable path 4 or a respective inverse most probable path 7 is recalculated repeatedly, which is not optimal with respect to system latency.

Since it can be noted that the most probable path 4 will always be the same for any vehicle 2 at a given position in the road network 1, with a given direction of movement, and that the inverse most probable path 7 will always be the same for any given position in the road network 1 it is concluded that the most probable path 4 and the inverse most probable path 7 depends not on the instance of the vehicle 2 but rather on the position of a vehicle 2 in the road network 1. Based on this observation, it is possible to optimize the cloud logic 5. Instead of recalculating the most probable path 4 and/or the inverse most probable path 7 repeatedly, the cloud logic 5 could instead use a look-up table 6 that stores most probable paths 4 and/or inverse most probable paths 7 for any given position, possibly with direction considered, in the road network 1. Such an optional look-up table 6 is illustrated schematically at the cloud logic 5 in FIGS. 1 and 2.

Thus, in an alternative embodiment the method instead of repeated recalculation further comprises the steps of: either having a cloud logic 5 use a look-up table 6 with stored most probable paths 4 for any given position, possibly with direction considered, in the road network 1 for determining the most probable path 4 of the vehicle 2 whenever the vehicle 2 reports an update on its current position, and checking if there is any new subset of existing data $D_N$ related to a location within the road network 1 along the determined most probable path 4; and if so, selecting that new subset of existing data $D_N$; or having a cloud logic 5 use a look-up table 6 with stored inverse most probable paths 7 for any given position, possibly with direction considered, in the road network 1 whenever the vehicle 2 reports an update on its current position and checking if the updated current position, possibly with direction considered, of the vehicle 2 within the road network 1 is included in an inverse most probable path 7 related to any new subset of existing data $D_N$, and if the updated current position, possibly with direction considered, of the vehicle 2 within the road network 1 is included in an inverse most probable path 7 related to a new subset of existing data $D_N$ selecting that new subset of existing data $D_N$; and sending the selected new subset of existing data $D_N$ to the vehicle 2.

The realization of the cloud logic 5 may be done using a concept for streaming data where the current position of the vehicle 2 is constantly checked against any new subset of existing data $D_N$ related to a location within the road network 1 along a determined most probable path 4 and/or against an inverse most probable path 7 related to any new subset of existing data $D_N$. Hereby it will be possible to send to the vehicle 2 any new subset of existing data $D_N$ relevant to the vehicle 2 without incurring unnecessary delays.

In some embodiments herein the look-up table 6 is provided as data $D_1$-$D_n$ added to a digital map data structure of the road network 1, with most probable path 4 and/or inverse most probable path 7 data added for positions along every road segment or road node represented in the digital map data structure.

Using a look-up table 6, the cloud logic 5 will be quicker and more effective to find the most probable path 4 and/or inverse most probable path 7 for a given position, possibly with direction considered, in the road network 1, instead of having to re-calculate the most probable path 4 and/or inverse most probable path 7 repeatedly.

For any new position, possibly with direction considered, reported by the vehicle 2 to the cloud 3, the cloud logic 5 will check the look-up table 6 to find the corresponding most probable path 4 or inverse most probable path 7. Whenever the look-up table 6 includes an entry with a pre-calculated most probable path 4 or inverse most probable path 7, it will use that entry.

If the look-up table 6 is missing a most probable path 4 for the position, possibly with direction considered, in the road network 1 where the vehicle 2 is located, the cloud logic 5 will call an algorithm, often a relatively slower algorithm, to calculate a most probable path 4 for that position, possibly with direction considered, in the road network 1 and populates it in the look-up table 6. This will gradually populate the look-up table 6.

Thus, if the look-up table 6 is missing a most probable path 4 for the position, possibly with direction considered, in the road network 1 where the vehicle 2 is located, according to some embodiments of the method the cloud logic 5 calculates a most probable path 4 for that position, possibly with direction considered, in the road network 1 and populates it in the look-up table 6.

The most probable path 4 or inverse most probable path 7 for a given position, possibly with direction considered, in the road network 1 could be set to have an expiry time in the look-up table 6. When the most probable path 4 or inverse most probable path 7 has passed its expiry time, it is deleted. Thus, according to some embodiments of the method a most probable path 4 or inverse most probable path 7 for a given position, possibly with direction considered, in the road network 1 is set to have an expiry time in the look-up table 6, such that the most probable path 4 or inverse most probable path 7 is deleted from the look-up table 6 once it has passed its expiry time.

As soon as another vehicle 2 reports its current position, possibly with direction considered, a new most probable path 4 or inverse most probable path 7 will have to be re-calculated and stored in the look-up table 6. Therefore, according to some embodiments of the method the most probable path 4 or inverse most probable path 7 is recalculated directly after deletion thereof and the look-up table 6 updated with the recalculated most probable path 4 or inverse most probable path 7.

The above method steps of deletion, re-calculation and updating of the look-up table 6 will ensure that the look-up table 6 is up to date and adapt the look-up table 6 to any changes in the road network 1, e.g. removed, closed, added or reopened roads.

Additionally, recalculating the most probable path 4 or inverse most probable path 7 directly after deletion will avoid a higher latency for the next vehicle 2 reporting its position in that location.

Alternatively, instead of deleting the most probable path 4 or inverse most probable path 7 from the look-up table 6 once it has passed its expiry time and then re-calculating an updated most probable path 4 or inverse most probable path 7, it is possible to re-calculate an updated most probable path 4 or inverse most probable path 7 first and then comparing it to the existing most probable path 4 or inverse most probable path 7 and replacing the entry in the look-up table 6 only if the re-calculated and the existing entry are different. This will lead to higher availability and less workload and further eliminates any time gap between deletion and update.

In some embodiments, the most probable path 4 or inverse most probable path 7 can be recalculated only for such sections of a map that are updated. This will reduce the amount of recalculations necessary each time the map is updated. According to such embodiments of the method, upon updating the digital map data structure the most probable path 4 or inverse most probable path 7 is recalculated for positions along each respective road segment or road node of the digital map data structure that is updated and the look-up table 6 updated correspondingly.

When the cloud logic 5 is using the most probable path 4 to retrieve a relevant subset of existing data, potentially safety related, to be sent to a vehicle 2 from the cloud 3 right after the vehicle 2 has reported an updated current position, one can think of this as a process where the cloud logic 5 extends the search-horizon ahead of the vehicle 2, defined as the most probable path 4, at each new position the vehicle 2 reports to the cloud 3.

In additions, to improve the predictability of the most probable path 4, a vehicle's historical pattern can be used to further optimize the most probable path 4 of a specific vehicle 2. If the cloud logic 5 keeps track of typical routes that a unique vehicle 2 often follows, the cloud logic 5 will be able to better predict the unique most probable path 4 for that unique vehicle 2.

According to such embodiments of the method the vehicle's historical travel pattern in the road network 1 is used to optimize the most probable path 4 of this specific vehicle 2 through the cloud logic 5 keeping track of typical routes in the road network 1 that this specific vehicle 2 often follows and using this historical travel pattern in the road network 1 to predict a unique most probable path 4 for this specific vehicle 2.

For embodiments using the vehicle's historical travel pattern and incorporating a look-up table 6 the method should preferably comprise that the unique most probable path 4 for the specific vehicle 2 is included in the look-up table 6.

The look-up table 6 will then include unique entries for each vehicle 2 for those locations in the road maps where the vehicles have a strong pattern of habitual travels.

Furthermore, the most probable path 4 will typically include a number of alternative branches that a vehicle 2 could follow. Each branch is an alternative for the continued route but not all branches will actually be followed. In some cases, it can be concluded that it will be more likely that the vehicle 2 will follow some branches and less likely that it will follow some other alternative branches in the most probable path 4. In such cases, the probability of a vehicle 2 ending up in the various positions in the most probable path 4 will be the product of the probability that the vehicles enters each branch leading to that point in the most probable path 4. Given this, it is possible to associate a probability to each point or segment in the most probable path 4, based on the location of the data and the probability that the vehicle 2 will pass that location (point or segment) in the most probable path 4.

In the general case, a vehicle 2 is more likely to follow larger roads, or to follow roads where traffic flow is known to be higher. The calculation of the probability in the most probable path 4 can be further improved through the usage of the historical pattern for a specific vehicle 2. A certain vehicle 2 might not follow the typical traffic stream but might most often follow another route, e.g. to a workplace or a residence. Such historical route data for a specific vehicle 2 can be used to better predict the probability of branches in the most probable path 4 for that specific vehicle 2.

Additionally, routes with very low traffic flow may be chosen not to be added to the look-up table 6 in order to reduce storage requirements and improve look-up times.

Still further, the method, as illustrated in FIG. 2, will also work to help the cloud logic 5 to retrieve all vehicles to which any new data $D_{n+1}$ received by the cloud 3 should be conveyed, while the above primarily dealt with the task of finding relevant data for a specific vehicle 2 based on the position of the vehicle 2.

Typically, the new data $D_{n+1}$ could be some safety related hazard, such as an accident, reported to the cloud 3 at a certain location 8 in the road network 1. Thus, the task here is not to find the probable path in front of a vehicle 2 but rather to find all the paths in the road network 1 that lead up to the location 8 related to the new data $D_{n+1}$, possibly with direction considered, bearing in mind that the objective is to find all vehicles 2 to which the new data is relevant, i.e. for safety related data all the vehicles 2 that should be warned.

This can be achieved based on the concept of an inverse most probable path 7. The inverse most probable path 7 of a position in the road map will be the subset of the road map that includes the subset of roads, possibly with direction considered, that leads to that given location 8 in the road network 1. For a given point in the road network 1, there will be an inverse most probable path 7. The inverse most probable path 7 is often the same as the most probable path 4 but with opposite direction. However, this might not always be true, e.g. for one-way roads and on highway roads having separate lanes for different directions, etc.

Any vehicle 2 with its current position reported to be within the inverse most probable path 7 of a location 8 in the network is probable to continue its journey to that location 8. This makes the inverse most probable path 7 the right tool to find all vehicles 2 that should receive data related to a specific location 8 in the road network 1.

It is also possible to rely on the most probable path 4 and check if the location 8 in the road network 1 related to the new subset of data $D_{n+1}$ is included the most probable path of the vehicle 2.

A new subset of data $D_{n+1}$ may also be generated by an updated location 8 in the road network 1 for a respective subset of cloud 3 stored data $D_1$-$D_n$ being reported to the cloud logic 5, e.g. if a hazard relating to a moving vehicle has been reported and a subsequent update relating to the position of the hazardous vehicle is made as the hazardous vehicle has moved to an updated location 8.

Thus, according to some embodiments of the method, whenever a new subset of data $D_{n+1}$ related to a location 8 in the road network 1 is reported to the cloud logic 5, as illustrated in FIG. 2 by the dotted arrow, the following steps are performed: either determining an inverse most probable path 7 up to the location 8 related to the new subset of data $D_{n+1}$ as a set of all possible paths in the road network 1 leading up to the location 8 related to the new subset of data $D_{n+1}$ and checking if the current position of the vehicle 2, possibly with direction considered, within the road network 1 is included in the inverse most probable path 7, and if the current position of the vehicle 2, possibly with direction considered, within the road network 1 is included in the inverse most probable path 7 sending the new subset of data $D_{n+1}$ to the vehicle 2; or determining a most probable path 4 of the vehicle 2 as a set of all possible paths ahead of the vehicle 2 that the vehicle 2 is most probable to travel along given its current position, possibly with direction considered, within the road network 1, and checking if the location 8 in the road network 1 related to the new subset of data $D_{n+1}$ is included the most probable path 4, and if the location 8 in the road network 1 related to the new subset of data $D_{n+1}$ is included the most probable path 4 sending the new subset of data $D_{n+1}$ to the vehicle 2.

For embodiments that do not incorporate a look-up table 6 the method should preferably further comprise the steps of: either having a cloud logic 5 calculate the inverse most probable path 7 for determining the inverse most probable path 7 whenever a new subset of data $D_{n+1}$ related to a location 8 in the road network 1 is reported to the cloud logic 5; or having a cloud logic 5 calculate the most probable path 4 for determining the most probable path 4 whenever a new subset of data $D_{n+1}$ related to a location 8 in the road network 1 is reported to the cloud logic 5.

However, as low latency is required for safety related applications, in the same way as described earlier, a pre-calculated look-up table 6 for inverse most probable path 7 and/or most probable path 4 could be used to speed up the cloud logic 5 and reduce system latency. Thus, according to some embodiments the method further comprises the steps of: either having a cloud logic 5 use a look-up table 6 with stored inverse most probable paths 7 for any given position in the road network 1 for determining the inverse most probable path 7 whenever a new subset of data $D_{n+1}$ related to a location 8 in the road network 1 is reported to the cloud logic 5; or having a cloud logic 5 use a look-up table 6 with stored most probable paths 4 for any given position in the road network 1 for determining the most probable path 4 whenever a new subset of data $D_{n+1}$ related to a location 8 in the road network 1 is reported to the cloud logic 5.

Accordingly, whenever new safety related data $D_{n+1}$ is reported to the cloud logic 5, the corresponding inverse most probable path 7 and/or most probable path 4 is calculated or preferably retrieved from the look-up table 6. Any vehicle 2 that has reported its last position so that it is included in the inverse most probable path 7 or any vehicle 2 for which the location 8 in the road network 1 related to the new subset of data $D_{n+1}$ is included the most probable path 4 will be sent the new safety related data $D_{n+1}$. This strategy will ensure that the new safety related data $D_{n+1}$ is sent only to the vehicle 2 to which it is relevant, with some probability, and without any unnecessary delays.

If the look-up table 6 is missing an inverse most probable path 7 up to the location 8 related to the new subset of data $D_{n+1}$, the cloud logic 5 will call an algorithm, often a relatively slower algorithm, to calculate an inverse most probable path 7 up to the location 8 related to the new subset of data $D_{n+1}$ and populates it in the look-up table 6. This will gradually populate the look-up table 6.

Thus, if the look-up table 6 is missing an inverse most probable path 7 up to the location 8 related to the new subset of data $D_{n+1}$, according to some embodiments of the method the cloud logic 5 calculates an inverse most probable path 7 up to the location 8 related to the new subset of data $D_{n+1}$ and populates it in the look-up table 6.

Thus, the above described method will manage bandwidth frugally and not incur unmotivated cost for data traffic, especially if that data traffic is routed over a cell network, and is therefore suitable for lowest latency unicast routing in cloud 3 based vehicle 2 safety applications.

Both most probable path 4 and inverse most probable path 7 is relevant in the same system realization. The most probable path 4 and/or the inverse most probable path 7 can be used to find all relevant data whenever a vehicle 2 reports an updated position. This may e.g. be triggered by a new position update from a vehicle 2. Both the inverse most probable path 7 and most probable path 4 can, as illustrated above, be used to find all vehicles 2 to which new reported data is relevant. This is triggered by new data, possibly safety related data, reported to the cloud 3, e.g. by another connected vehicle (not shown) operating in the road network 1 to which the information is relevant, by a traffic control center or other infrastructure for forwarding new data relating to the road network 1 to the associated cloud 3.

Accordingly, it is herein further suggested a system for selecting a subset $D_S$ of cloud 3 stored data $D_1$-$D_n$ related to locations within a road network 1 and sending the selected subset of data $D_S$ to a vehicle 2 which is connected to the cloud 3 and operates within the road network 1, which system comprises a cloud storage arrangement 3 for storage of data $D_1$-$D_n$ related to the road network 1 and a cloud logic 5 for determination of most probable paths 4 and/or inverse most probable paths 7 as well as a communication arrangement 9 connected thereto, as illustrated by the interconnecting arrow of FIGS. 1 and 2, for receiving a position, possibly with direction considered, of the vehicle 2 and sending subsets of data $D_S$ to the vehicle 2, as illustrated by the pair of counter-directed zig-zag arrows of FIGS. 1 and 2, in accordance with the method according to any one of the above described embodiments.

It should be noted that the vehicle 2 and the communication arrangement 9 each may comprise any computer hardware and software and/or electrical hardware known in the art configured to enable communication between the vehicle 2 and the cloud storage 3 and/or cloud logic 5, such as one or more appropriately programmed processors and/or servers (e.g., one or more microprocessors including central processing units (CPU)) and associated memory, and/or one or more transceivers, including communication between the vehicle 2 and the cloud storage 3 and/or cloud logic 5 over one or more networks which may include cellular and/or other wireless networks. Such communication may include, as described herein, the vehicle 2 reporting vehicle position to the cloud storage 3 and/or cloud logic 5, by transmitting to the cloud storage 3 and/or cloud logic 5 position data that may be obtained by the vehicle 2 via a global positioning system (GPS), communication with other vehicles in the immediate vicinity of the vehicle 2, or via any other devices, networks, or techniques known in the art.

It should also be noted that the cloud storage 3 may comprise any type of storage device or arrangement known in the art, such as optical, solid state, disk and/or tape storage devices and controllers and/or one or more storage area networks. It should further be noted that the cloud logic 5 may comprise one or more appropriately programmed processors and/or servers (e.g., one or more microprocessors including central processing units (CPU)) and associated memory, which may include operating system software and/or application software executable by the servers and/or processors for controlling operation thereof and for performing the particular algorithms represented by the various functions and/or operations described herein. The cloud storage 3 and/or cloud logic 5 may be provided at a central location or at multiple different locations. As well, the vehicle 2 may also comprise one or more appropriately programmed processors (e.g., microprocessors including central processing units (CPU)) and associated memory, which may include operating system software and/or application software, configured to interact and/or cooperate with the cloud storage 3 and/or cloud logic 5. The method and system described herein may provide for distributed client-server computing involving the vehicle 2 and the cloud storage 3 and/or cloud logic 5 over one or more networks as previously described.

Hereby is provided a system implementation that will manage bandwidth frugally and not incur unmotivated cost for data traffic, especially if that data traffic is routed over a cell network, thus suitable for lowest latency unicast routing in cloud 3 based vehicle 2 safety applications.

It is envisaged that the above described method and system incorporating the concepts of most probable path 4 and inverse most probable path 7 will be highly relevant for cloud 3 based safety application as well as applications for autonomous vehicles which are dependent on cloud 3 based data.

The above-described embodiments may be varied within the scope of the following claims.

Thus, while there have been shown and described and pointed out fundamental novel features of the embodiments herein, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are equivalent. Moreover, it should be recognized that structures and/or elements and/or method steps shown and/or described in connection with any disclosed form or embodiment herein may be incorporated in any other disclosed or described or suggested form or embodiment as a general matter of design choice.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method for selecting a subset of cloud stored data related to locations within a road network and sending the selected subset of data to a vehicle which is connected to the cloud via a communication arrangement and operates within the road network, the method comprising:
   determining, via a cloud logic comprising a processor and associated memory, a current position and direction of the vehicle within the road network based on a vehicle position reported by the vehicle in at least one wireless signal received via the communication arrangement;
   determining, via the cloud logic, a respective inverse most probable path up to each respective location related to a respective subset of data as a respective set of possible paths in the road network leading up to a respective location related to a respective subset of data, and checking if the current position and direction of the vehicle within the road network are included in an inverse most probable path related to any subset of data, and if the current position and direction of the vehicle within the road network are included in an inverse most probable path related to a subset of data, then selecting that subset of data; and sending the selected subset of data to the vehicle in at least one wireless signal via the communication arrangement.

2. The method according to claim 1, whenever a new subset of data related to a location in the road network is reported to the cloud logic, further comprising:

determining an inverse most probable path up to the location related to the new subset of data as a set of possible paths in the road network leading up to the location related to the new subset of data and checking if the current position of the vehicle within the road network is included in the inverse most probable path, and if the current position of the vehicle within the road network is included in the inverse most probable path sending the new subset of data to the vehicle; or determining a most probable path of the vehicle as a set of possible paths ahead of the vehicle that the vehicle is most probable to travel along given its current position within the road network, and checking if the location in the road network related to the new subset of data is included the most probable path, and if the location in the road network related to the new subset of data is included the most probable path sending the new subset of data to the vehicle.

3. The method according to claim 2 further comprising:

having a cloud logic calculate the inverse most probable path for determining the inverse most probable path whenever a new subset of data related to a location in the road network is reported to the cloud logic; or having a cloud logic calculate the most probable path for determining the most probable path whenever a new subset of data related to a location in the road network is reported to the cloud logic.

4. The method according to claim 2 further comprising:

having a cloud logic use a look-up table with stored inverse most probable paths for any given position in the road network for determining the inverse most probable path whenever a new subset of data related to a location in the road network is reported to the cloud logic; or having a cloud logic use a look-up table with stored most probable paths for any given position in the road network for determining the most probable path whenever a new subset of data related to a location in the road network is reported to the cloud logic.

5. The method according to claim 1 further comprising determining, via the cloud logic, a most probable path of the vehicle as a set of possible paths ahead of the vehicle that the vehicle is most probable to travel along given its current position within the road network, and selecting a subset of data related to a location within the road network that is along the most probable path of the vehicle.

6. The method according to claim 5 further comprising:

having a cloud logic calculate the most probable path whenever the vehicle reports an update on its current position in the road network, and checking if there is any new subset of existing data related to a location within or segment of the road network along the re-calculated most probable path, and if so, selecting the new subset of existing data; or having a cloud logic calculate a respective inverse most probable path up to each respective location related to a respective subset of data as a respective set of possible paths in the road network leading up to a respective location related to a respective subset of data, and checking whenever the vehicle reports an update on its current position in the road network if the updated current position of the vehicle within the road network is included in an inverse most probable path related to any new subset of existing data, and if the updated current position of the vehicle within the road network is included in an inverse most probable path related to a new subset of existing data selecting that new subset of existing data; and sending the selected new subset of existing data to the vehicle.

7. The method according to claim 5 further comprising:

having a cloud logic use a look-up table with stored most probable paths for any given position in the road network for determining the most probable path of the vehicle whenever the vehicle reports an update on its current position, and checking if there is any new subset of existing data related to a location within the road network along the determined most probable path; and if so, selecting that new subset of existing data; or having a cloud logic use a look-up table with stored inverse most probable paths for any given position in the road network whenever the vehicle reports an update on its current position and checking if the updated current position of the vehicle within the road network is included in an inverse most probable path related to any new subset of existing data, and if the updated current position of the vehicle within the road network is included in an inverse most probable path related to a new subset of existing data selecting that new subset of existing data; and sending the selected new subset of existing data to the vehicle.

8. The method according to claim 7 wherein the look-up table is provided as data added to a digital map data structure of the road network, with most probable path or inverse most probable path data added for positions along every road segment or road node represented in the digital map data structure.

9. The method according to claim 8 wherein, upon updating the digital map data structure, the most probable path or inverse most probable path is recalculated for positions along each respective road segment or road node of the digital map data structure that is updated and the look-up table updated correspondingly.

10. The method according to claim 7 wherein a most probable path or inverse most probable path for a given position in the road network is set to have an expiry time in the look-up table, such that the most probable path or inverse most probable path is deleted from the look-up table once it has passed its expiry time.

11. The method according to claim 10 wherein the most probable path or inverse most probable path is recalculated directly after deletion thereof and the look-up table updated with the recalculated most probable path or inverse most probable path.

12. The method according to claim 7 wherein, as soon as a vehicle reports a current position within the road network, a most probable path is calculated for that position within the road network and stored in the look-up table.

13. The method according to claim 7 wherein, if the look-up table is missing a most probable path for the position in the road network where the vehicle is located, the cloud logic calculates a most probable path for that position in the road network and populates it in the look-up table.

14. The method according to claim 7 wherein the vehicle's historical travel pattern in the road network is used to optimize the most probable path of this specific vehicle through the cloud logic keeping track of typical routes in the road network that this specific vehicle often follows and using this historical travel pattern in the road network to predict a unique most probable path for this specific vehicle.

15. The method according to claim 14 wherein the unique most probable path for the specific vehicle is included in the look-up table.

16. A system for selecting a subset of cloud stored data related to locations within a road network and sending the selected subset of data to a vehicle which is configured to be connected to the cloud and operate within the road network, the system comprising:
- a cloud storage arrangement for storage of data related to the road network;
- a cloud logic comprising a processor and associated memory for determination of inverse most probable paths; and
- a communication arrangement for receiving a position of the vehicle and sending subsets of data to the vehicle;

wherein the system is configured to
- determine, via the cloud logic, a current position and direction of the vehicle within the road network based on a vehicle position reported by the vehicle in at least one wireless signal received via the communication arrangement;
- determine, via the cloud logic, a respective inverse most probable path up to each respective location related to a respective subset of data as a respective set of possible paths in the road network leading up to a respective location related to a respective subset of data, and checking if the current position and direction of the vehicle within the road network are included in an inverse most probable path related to any subset of data, and if the current position and direction of the vehicle within the road network are included in an inverse most probable path related to a subset of data, then selecting that subset of data; and
- send the selected subset of data to the vehicle in at least one wireless signal via the communication arrangement.

17. The system according to claim 16 wherein the system is further configured to determine, via the cloud logic, a most probable path of the vehicle as a set of possible paths ahead of the vehicle that the vehicle is most probable to travel along given its current position within the road network, and selecting a subset of data related to a location within the road network that is along the most probable path of the vehicle.

* * * * *